United States Patent [19]
Guimier et al.

[11] Patent Number: 5,468,123
[45] Date of Patent: Nov. 21, 1995

[54] SYSTEM FOR VENTILATING THE TURBINE DISKS AND STATOR OF A TURBO JET ENGINE

[75] Inventors: Michel Guimier, Mormant; Philippe M. Paris, Le Mee Sur Seine, both of France

[73] Assignee: Societe Nationale D'Etude et de Construction de Moteurs D'Aviation "Snecma", Paris, France

[21] Appl. No.: 280,541

[22] Filed: Jul. 26, 1994

[30] Foreign Application Priority Data

Aug. 5, 1993 [FR] France .................................. 93 09657

[51] Int. Cl.⁶ .............................. F01D 5/08; F01D 25/12
[52] U.S. Cl. .............................. 415/178; 415/26; 415/50; 415/118; 415/177; 415/179; 60/39.29; 60/39.75
[58] Field of Search .................................. 415/26, 47, 49, 415/50, 115–118, 176, 177, 178, 179, 180; 60/39.75, 39.29

[56] References Cited

U.S. PATENT DOCUMENTS

| | | | |
|---|---|---|---|
| 4,815,272 | 3/1989 | Laurello | 60/39.75 |
| 4,872,807 | 10/1989 | Thompson | 415/118 |
| 4,893,983 | 1/1990 | McGreenan | 60/39.29 |
| 5,154,578 | 10/1992 | Miracourt et al. | 415/116 |

FOREIGN PATENT DOCUMENTS

| | | |
|---|---|---|
| 0511935 | 11/1992 | European Pat. Off. . |
| 0564135 | 10/1993 | European Pat. Off. . |
| 2557207 | 6/1985 | France . |
| 2585407 | 1/1987 | France . |

Primary Examiner—Edward K. Look
Assistant Examiner—Christopher Verdier
Attorney, Agent, or Firm—Oblon, Spivak, McClelland, Maier & Neustadt

[57] ABSTRACT

The system makes it possible to reduce the clearances existing between the rotor and stator of a turbine (40) of a turbo jet engine during the various operating phases of the latter whilst keeping the temperatures of the disks inside the limits of their mechanical behaviour. The disks (4) of the turbine (40) are ventilated via the sampling of high pressure air at a high temperature (2) and the stator via the sampling of low pressure air at a low temperature (3). The respective temperatures of these two samplings are homogenized by a heat exchanger (1). This exchanger is short-circuited by a branch circuit connection (5) on the low pressure circuit so as to keep as stable as possible the clearances inside the turbine (40) according to the various ranges of capacity of the turbo jet engine by means of a valve (6) controlled by the computer.

Application for aircraft turbo jet engines.

5 Claims, 3 Drawing Sheets

SYSTEM FOR VENTILATING THE TURBINE DISKS AND STATOR OF A TURBO JET ENGINE

FIELD OF THE INVENTION

The invention concerns turbo jet engines having a turbine whose disks or blades and the stator are to be kept at one or several optical operating temperatures. This applies in particular to aircraft propulsion turbo jet engines. In particular, the invention concerns the ventilation of the disks and stator of the turbine of this type of engine.

BACKGROUND OF THE INVENTION

Gas turbo-engines, such as axial flow turbo jet engines, have a compression stage, a combustion stage and a turbine stage. The gas axially traverses these various stages. First of all, it is compressed in the compression stage and then burnt with the fuel in the combustion stage. Finally, it is tapered off in the turbine stage so as to provide work for the rotor and accordingly the thrust produced by the turbo jet engine. The rotor of this stage is equipped with disks.

Now, as the operating temperatures gradually increase inside the turbo jet engine, it is necessary to provide cooling air under pressure to the disks of the rotor of the turbine as these disks are located extremely close to the outlet zone of the combustion chamber and undergo significant cubical expansions. In fact, it is assumed that the technology of the disks of the turbine is determined so as to adjust the cubic expansion of the rotor to that of the stator during the cruising phase so that the performances of the turbo jet engine are kept at their highest level. Accordingly, during the lift-off and/or flight climbing stages with the turbo jet engine functioning at full capacity, the temperatures of the components of the turbines are above the limits imposed by their mechanical behaviour. It is therefore essential to ensure that these situations are avoided and accordingly ensure the cooling of the disks of the turbine by means of sufficiently fresh air.

In this respect, reference may be made to the patent document FR-A-2 557 207 disclosing a cooling system for providing an air pad with a compartment of bearings in a turbo jet engine. In this system, a cold air source is taken from the blower of the turbo jet engine. An under-pressure gas source is taken from the rear stage of the high pressure compressor, this air existing at a high temperature. A heat exchanger is used for cooling this high pressure air with the aid of the cold air taken from the blower.

The object of the invention is to improve the effectiveness of these devices by enabling the system to act on the disks and stator of the turbine, irrespective of the range of capacity of the turbo jet engine, with the aim of keeping the disks and the stator in a relatively restricted temperature range so as to avoid any excessive significant cubical expansions and excess temperatures.

Secondly, there are similar devices distributing the cooling air on the disks of the turbine by using four different pipes so as to intervene on several stages of the turbine.

SUMMARY OF THE INVENTION

To this effect, the main object of the invention concerns a system for ventilating the disks and stator of a turbine of a turbo jet engine and including:
a first sampling of air at high pressure and at a relatively high temperature for cooling the disks;
a sampling of cold air at a low temperature and at low pressure for cooling the stator;
a heat exchanger applied to these two air samplings so as to cool the hot air existing at high pressure, the cold air at low pressure thus being reheated so as to allow for optimal cooling of the disks and stator during the full capacity operating phases of the turbo jet engine.

According to the invention, when these two air samplings are divided into several cooling tubes, a branch circuit connection is provided on the low pressure sampling so as to short-circuit the heat exchanger, and a valve placed upstream of the low pressure branch circuit connection is controlled in such a way as to adjust the feeding of this branch circuit connection according to the range of capacity of the turbo jet engine.

In the main embodiment of the system of the invention, the cooling tubes derived from the high pressure sampling open close to the disks of the rotor so as to cool them.

Similarly, the cooling tubes derived from the low pressure calbration open close to the stator so as to cool them.

Preferably, a second hot air high pressure sampling is provided and passes into the heat exchanger so as to allow for an increase of the high pressure hot air passing into the exchanger so as to reheat the disks of the turbine during the operating phases of this turbo jet engine when cruising, the cold air then accordingly being reheated.

The efficiency of the system is improved when, for each cooling tube, the system includes:
a pressure sensor placed upstream of the heat exchanger on each cooling tube;
a controlled valve placed on each cooling tube upstream of the pressure sensor;
a computer being connected to the outlet of each pressure sensor and to the inlet of each controlled valve so as to regulate the controlled valves according to the thermodynamic parameters and operating conditions of the turbo jet engine, and secondly according to any possible fall of pressure in one of the cooling tubes.

BRIEF DESCRIPTION OF THE DRAWINGS

The invention and its technical characteristics shall be better understood from a reading of the following description with reference to the accompanying figures, namely respectively.

DETAILED DESCRIPTION OF THE PREFERRED EMBODIMENTS

Figure 1:
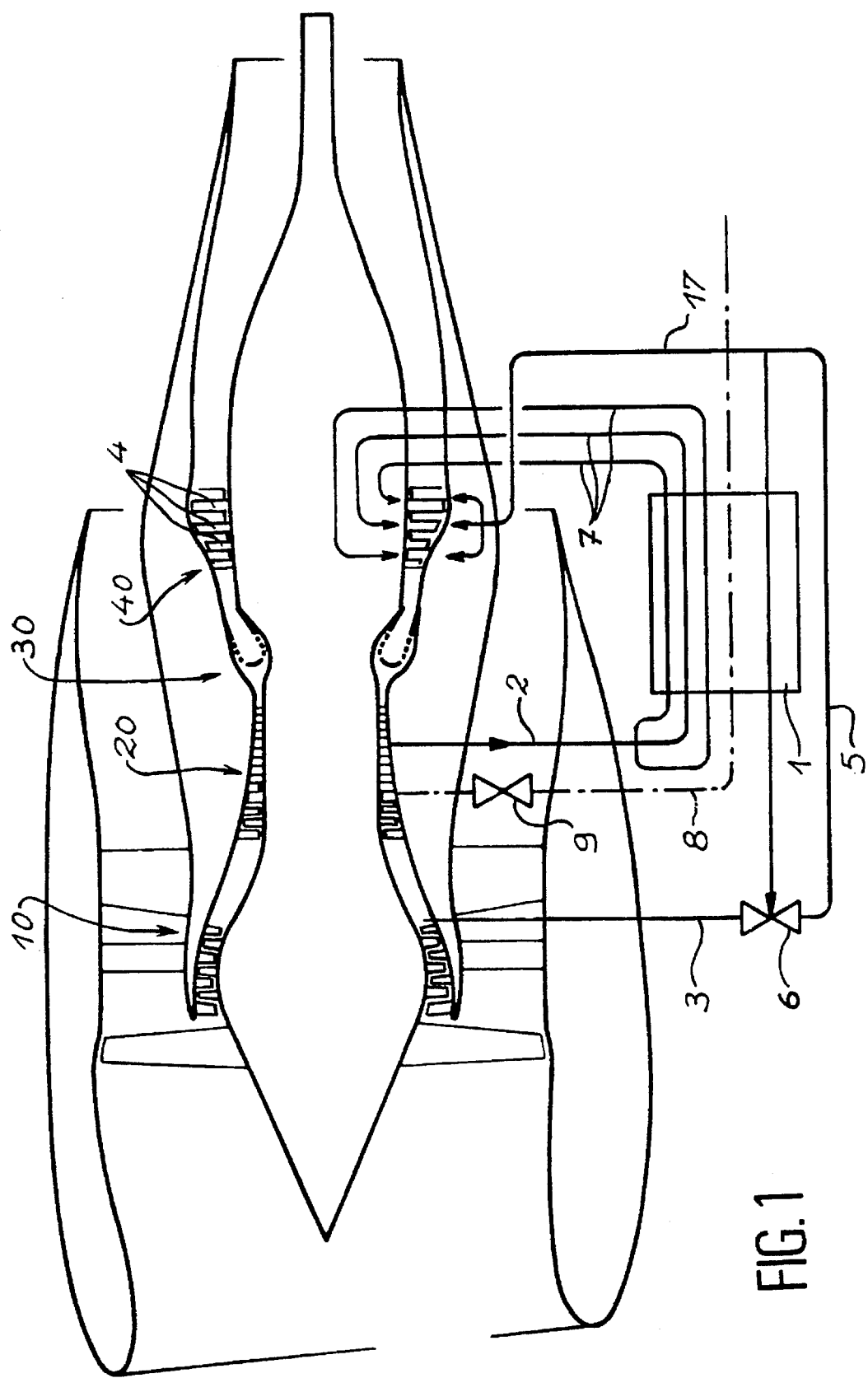
FIG. 1 is diagram of the installation of the system of the invention on a turbo jet engine for civil aviation.

FIG. 1 shows a sectional view of a turbo jet engine of the type installed on a civil aircraft (CEM56 type).

With reference to FIG. 21, it is possible to distinguish the main stages of the internal flow of the turbo jet engine, namely the low pressure compressor 10, followed by the high pressure compressor 20, followed by the combustion chamber 30 followed by the turbine 40. The disks 4 of the latter, as has been explained, are therefore to be cooled during the full capacity gas phases of the turbo jet engine. Subsequently, it shall be seen that it is also useful to heat them during the low speed or cruising speed operating phases of the turbo jet engine.

The temperature adjustment of the disks 4 of the turbine is thus effected by means of an air ventilation network at a specific temperature. This network mainly comprises a first high pressure air taken 2 from the high pressure compressor 20 of the turbo jet engine. The high pressure air taken is used to cool the disks 4. In addition, it is necessary to cool this high pressure air in certain operating phases.

The device therefore includes a low pressure sampling 3 of cold air at a relatively low temperature. This low pressure air sampling 3 is made from the low pressure compressor 10.

Finally, a heat exchanger 1 is used to confront the air taken from this first high pressure air sampling 2 and the low pressure air sampling 3. The high pressure air at the outlet of this heat exchanger 1 is thus cooled and the low pressure air is reheated.

The first sampling of high pressure air 2 is divided into several cooling tubes 7 so that this high pressure air can be distributed with good peripheral homogeneity on the various disks 4 of the rotor of the turbine 40. These cooling tubes 7 preferably pass into the heat exchanger 1. They could nevertheless only exist downstream of the latter. The mechanical linking of these cooling tubes 7 with the rotor may be effected by means of a revolving joint (not shown) or by a known device, this link passing through the low pressure distributing stage.

According to the invention, a branch circuit connection 5 is installed on the low pressure air sampling 3, thus short-circuiting (or by passing) the heat exchanger 1. The connection of this branch circuit connection 5 upstream of the heat exchanger 1 is effected with the aid of a valve 6. The low pressure air flow may therefore be modulated so as to be able to adjust the outgoing temperature of this low pressure air by means of a ventilation tube 17 opening opposite the stator. As a result, the outgoing temperature of the high pressure air in the cooling tubes 7 is thus adjusted. Thus, one can readily understand that it is possible to adjust the respective temperatures and cubical expansions of the disks of the rotor and stator for various series of operating conditions of the turbo jet engine, this being the case during the flight of an airplane, and obtain an improvement of their mechanical behaviour.

The law for regulating this valve 6 is determined by the computer of the turbo jet engine according to the thermodynamic parameters introduced into it.

With reference again to FIG. 1, it is possible to add a second high pressure hot air sampling 8 in parallel with the first sampling 2. This second high pressure air sampling 8 passes inside the heat exchanger 1. It is equipped with a flowrate adjustment valve 9 placed upstream of the heat exchanger 1.

Accordingly, it is possible to increase the amount of heat transitting through the heat exchanger 1 and being transmitted to the low pressure cold air. This variant makes it possible to keep the disks of the rotor and stator of the turbine 40 at a slightly higher temperature. This is used during the cruising speeds of the turbo jet engine as this makes it possible to reduce the flow of cold air transmitted in particular to the disks 4 of the rotor, again according to the temperature and cubical expansions of the various elements of the turbo jet engine at this level. Thus, the hot and cold air flowrates may be optimized according to the penalizing factors caused by their samplings to the operating cycles and sensitivity of the aerodynamic performances of the turbine with respect to the clearances existing between the various members constituting them, whilst sampling into account the mechanical behaviour of the elements.

The air taken by the second sampling of high pressure hot air 8 may be subsequently restored inside the gas vein of the turbo jet engine.

Figure 3:
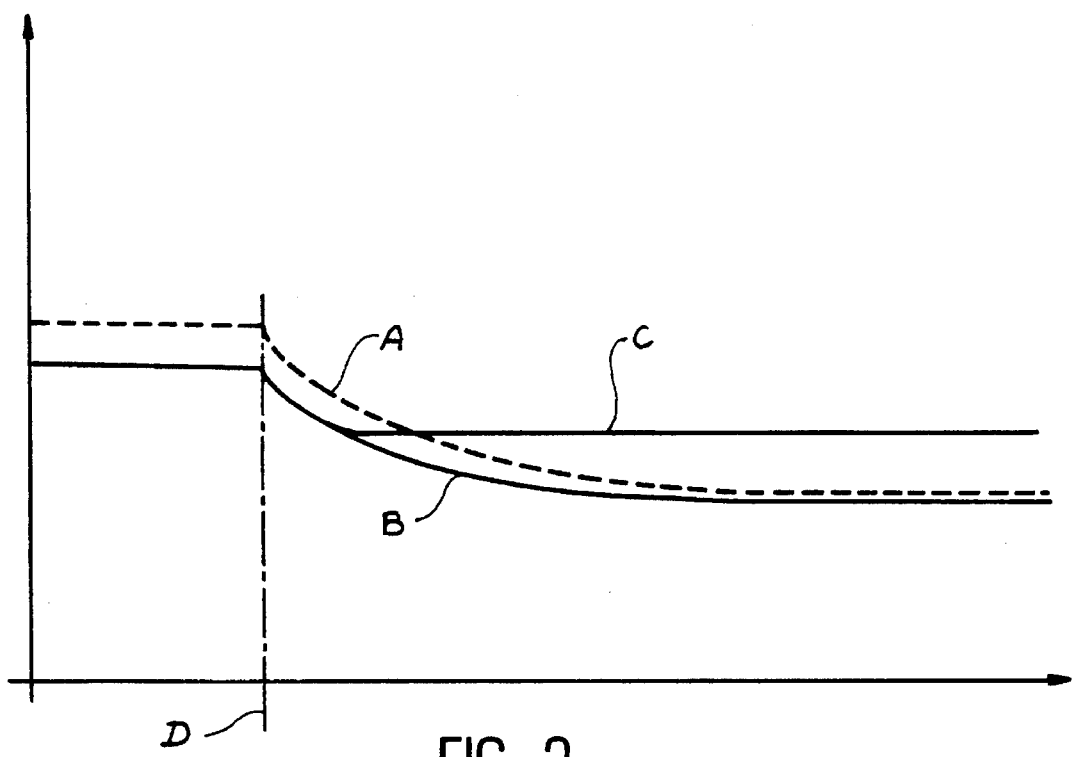
FIG. 3 shows comparative curves of the temperature of the rotor in a turbo jet engine on which the system of the invention is installed.

On FIG. 3, variations of the temperature of the rotor (ordinates) is shown by the broken line of the curve A with respect to the mission time of the aircraft equipped with a conventional turbo jet engine (abscisses). During the running period of the plane at ground level, that is prior to the point D, the temperature of the rotor is relatively high but constant. At the point D, the plane takes off and the operating temperatures of the turbo jet engine reduce. Accordingly, the temperature of the rotor progressively lowers so as to stabilize on a specific value shown by a horizontal line.

Shown by the full lines is also the curve B of the temperature of the rotor on a turbo jet engine according to the invention. During the running time of an aircraft equipped with this type of turbo jet engine, the temperature of the rotor is constant but already less than that of the rotor of a turbo jet engine of the prior art. In fact, the disks of the rotor are already more copiously ventilated. After the point D with the plane having taken off, the temperature of the rotor drops so as to approach a specific value slightly lower than that of a rotor of a turbo jet engine of the prior art. The optimization obtained may however result in a slightly higher cruising temperature (curve C) allowing for a reduction of the clearances.

With the aim of further minimizing the variations between the constitutive elements of the turbine and accordingly the clearances between these various elements, an additional characteristic of the invention consists of further reducing this temperature difference.

Figure 2:
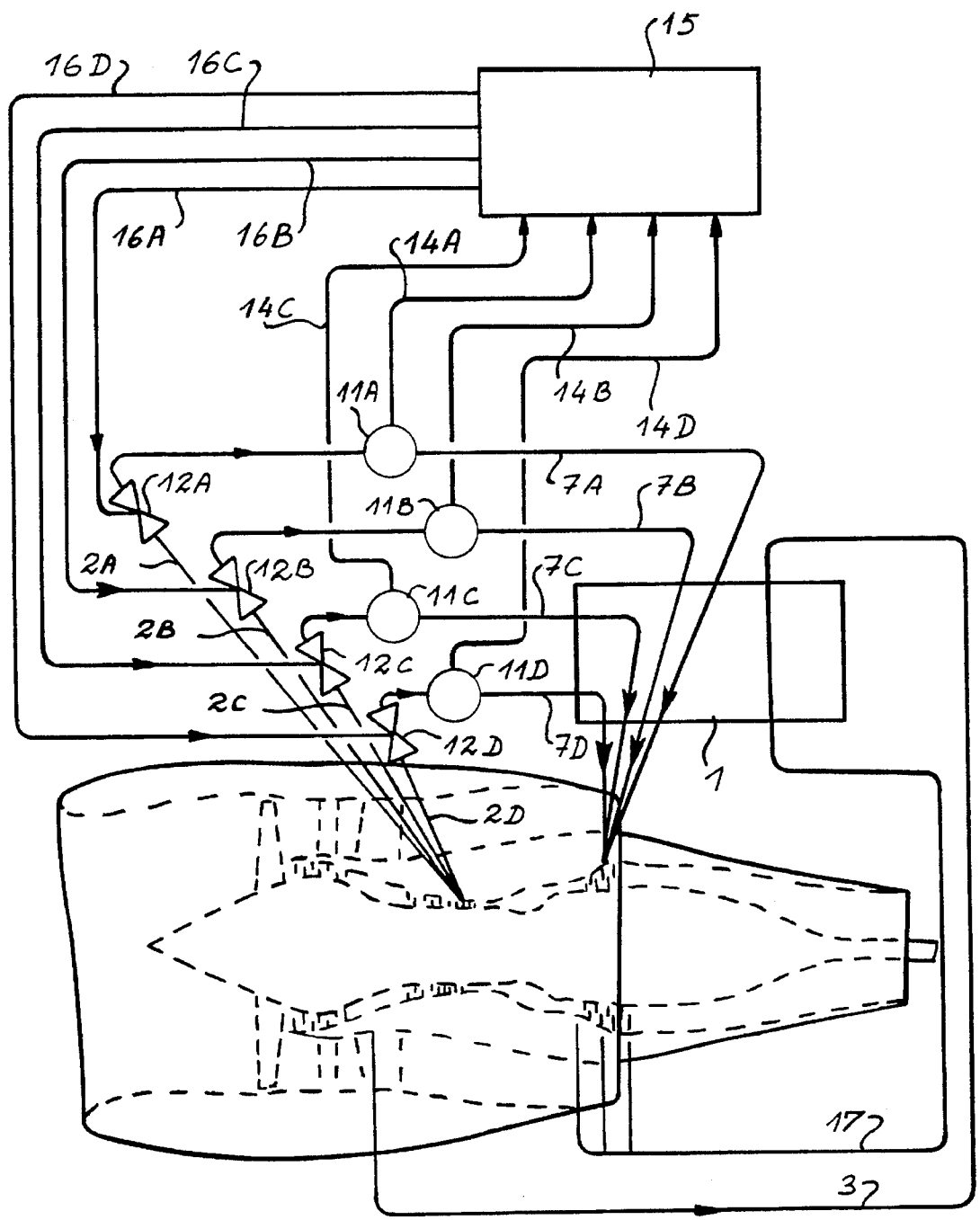
FIG. 2 is a diagram of the installation of the system of the invention improved by means of a technical characteristic.

FIG. 2 shows the placing on each first high pressure air sampling 2A, 2B, . . . 2N of a pressure sensor 11A, 11B, . . . 11N. The high pressure air samplings 2A, 2B, . . . 2N are connected to respective cooling tubes 7A, 7B, . . . 7N for distribution to the disks of the rotor. Each of these pressure sensors 11 is able to detect any possible fall of pressure in a first high pressure sampling 2. In fact, should a malfunction occur, that is when one of these samplings is broken, the pressure there quickly decreases and this anomaly is signalled immediately. With this aim in mind, each pressure sensor 11A, . . . . 11N is connected by a pressure link 14A, . . . . 14N to a computer 15. This computer is also connected to a valve 12A, . . . . 12N controlled by a control link 16A, . . . . 16N.

Thus, when a malfunction occurs in one of the first high pressure air samplings 2, the computer 15 is immediately notified of this and orders the controlled valves 12 of the other first high pressure air samplings 2 to compensate for the placing out of service of the first damaged hot air sampling. In other words, the controlled valves 12 are slightly more open so as to compensate for this placing out of service. The controlled valve placed on the first high pressure air sampling and which is damaged is immediately closed so as to avoid any air leaks occuring outside the turbo jet engine and thus retain the level of performance of said engine.

It is also possible to adjust the valves 12A, . . . . 12N according to the thermodynamic parameters and flight conditions of the device equipped with the turbo jet engine.

With reference again to FIG. 3, the full lines show a curve C symbolizing the temperature variations of the rotor of the turbine of the turbo jet engine of the invention and equipped with the variant described above. Immediately after take-off (point D), the temperature of this rotor may be quickly stabilized at a specific value. The temperature differences of this rotor are thus reduced to a minimum value.

An improvement of the mechanical behaviour of the components is obtained during the "severe" operating periods, that is the "full capacity" operating periods of the turbo jet engine.

On cruising, an improvement of the specific consumption of the turbo jet engine is obtained by adjusting the cooling flowrate of the rotor of the turbine. The increase of the temperature of the rotor with respect to the nominal conditions also makes it possible to reduce the flowrate of cooling air of the housing of the turbo jet engine by keeping identical the operating clearances between the rotor and the stator of the turbine.

What is claimed is:

1. A system for ventilating disks and a turbine stator of a turbo jet engine and including:

a first sampling of high pressure air at a relatively high temperature for cooling the disks, a sampling of low pressure air at a relatively low temperature for cooling the stator, a heat exchanger applied to these two air samplings so as to cool the hot air existing at high pressure, the cold air at low pressure thus being reheated so as to allow for optimal cooling of the disks and stator during full capacity operating phases of the turbo jet engine, wherein, with the first high pressure air sampling being divided into several cooling tubes, the system has:

a branch circuit connection placed on the low pressure sampling so as to short-circuit the heat exchanger, and a valve placed upstream of the branch circuit connection and controlled in such a way as to regulate feeding of this branch circuit connection according to the capacity of the turbo jet engine.

2. System according to claim 1, wherein the cooling tubes of the high pressure sampling open close to the disks of the turbine so as to cool them.

3. System according to claim 2, wherein the low pressure air sampling is subdivided into several cooling tubes opening close to the stator of the turbine.

4. System according to claim 1, wherein it includes a second high pressure hot air sampling passing into the heat exchanger so as to thus be able to increase the flow of hot air passing into the exchanger and further reheat the low pressure cold air so as to reheat the turbine disks during the operating phases of the turbo jet engine at cruising speed.

5. System according to claim 1, wherein it includes for each high pressure air cooling tube:

a pressure sensor placed upstream of the heat exchanger;

a controlled valve placed on the corresponding cooling tube upstream of the pressure sensor;

a computer being connected to the outlet of each sensor and to the inlet of each controlled valve so as to regulate these controlled valves according to thermodynamic parameters of operating conditions of the turbo jet engine, and secondly according to any possible fall of pressure in one of the high pressure cooling tubes.

\* \* \* \* \*